United States Patent [19]

Linder

[11] Patent Number: 5,577,473
[45] Date of Patent: Nov. 26, 1996

[54] VALVE FOR THE INTRODUCTION OF FUEL OR A FUEL/AIR MIXTURE INTO AN ENGINE

[75] Inventor: Ernst Linder, Muehlacker, Germany

[73] Assignee: Robert Bosch GmbH, Stuttgart, Germany

[21] Appl. No.: 560,141

[22] Filed: Nov. 17, 1995

[30] Foreign Application Priority Data

Nov. 18, 1994 [DE] Germany ................... 44 41 092.1

[51] Int. Cl.$^6$ ........................................ F02B 3/00
[52] U.S. Cl. ............................................ 123/298
[58] Field of Search .................... 123/298, 305, 123/169 PA, 169 PH, 309, 297; 239/453, 456, 533.12; 313/143, 120

[56] References Cited

U.S. PATENT DOCUMENTS 1,929,748  8/1932  Little ............................... 123/298
4,245,589  1/1981  Ryan ............................... 123/298
4,974,559  12/1990  Nagaoka ....................... 123/169 PA
4,982,708  1/1991  Stutzenburger ................. 123/297

*Primary Examiner*—Raymond A. Nelli
*Attorney, Agent, or Firm*—Edwin E. Greigg; Ronald E. Greigg

[57] ABSTRACT

A valve for the introduction of fuel or a fuel/air mixture in a combustion space of an internal combustion space of an internal combustion engine which works with charge stratification in the combustion space, and with spark ignition of the introduced fuel or fuel/air mixture by a spark plug. To ensure the ignition of the fuel/air mixture contained in the combustion space, there is branched off from an umbrella-like injection jet formed by the fuel or fuel/air mixture an ignition jet which, deviating from the umbrella-like or cone like configuration of the injection jet, comes into the region of the spark plug, in order thus to provide a fuel-rich fuel/air mixture in the region of a flashing over of the ignition spark of the spark plug. This takes place by means of a guide face of the valve, in which the guide face is interrupted by a recess.

12 Claims, 3 Drawing Sheets

VALVE FOR THE INTRODUCTION OF FUEL OR A FUEL/AIR MIXTURE INTO AN ENGINE

STATE OF THE ART

The invention proceeds from a valve for the introduction of fuel or a fuel/air mixture into an engine. In such a valve known from the SAE paper 72 00 52, January 1972, fuel is introduced in the form of a soft wide jet cone in the combustion space, in such a way that, with an otherwise averagely lean fuel/air mixture, a fuel-rich ignitible mixture comes into the vicinity of the spark plug likewise provided. The advantage of the direct injection described there is that a charge stratification of a fuel-rich mixture can be achieved in the otherwise low-fuel mixture, in such a way that the richer mixture can be ignited and nevertheless operation with an air coefficient of an averagely high $\Delta>1$ becomes possible. This results, furthermore, in a high degree of burnout of the fuel introduced in the combustion space being achieved, along with favorable thermodynamic conditions and, above all, with low charge exchange losses which arise during the throttling of the inlet ducts in other known spark-ignition internal combustion engines. This leads altogether to a low fuel consumption. The main problem here is that, on the one hand, the fuel-rich fat mixture layer has to be located in the region of the spark plug at the ignition time and, on the other hand, the fuel is to mix as fully as possible and not be precipitated on the surface of the combustion space. The position of the jet cone is therefore a problem which is difficult to solve, since the jet cone, on the one hand, has to be sufficiently short to remain in the combustion space and not to strike the wall of the combustion space, but, on the other hand, is to supply the spark plug electrode with a sufficiently rich fuel/air mixture. This problem occurs both in the two-stroke combustion process and in the four-stroke combustion process. Moreover, it is independent of the injection system in general, whether the fuel is injected directly as fuel or is blown in, surrounded by air, as a mixture. In two-stroke engines, a further aggravation is that pronounced fresh-air zones and residual-gas zones exist in the combustion space as a result of the particular scavenging conditions between the individual work cycles. A condition for sufficiently good inflammation is that both the fuel jet and the spark plug are in the region of a fresh-air zone. Problems of space in particular arise in this case. The distance between the injection jet, on the one hand, and the position of the spark plug, on the other hand, results, as a rule, in a relatively high cone angle of the jet cone, in conjunction with the disadvantage that a considerable wetting of the cylinder wall cannot be avoided on account of the conditions of space. The fuel applied to the wall evaporates poorly when the combustion space wall is relatively cold, in contrast to the striking of fuel against the hotter piston of the internal combustion engine, and therefore does not participate in the combustion and finally leaves the combustion space unburnt as a harmful HC constituent of the exhaust gas. Furthermore, fuel consumption is increased unnecessarily. The further disadvantage is that, because of the wide cone jet, there is the risk that, in the region of the cylindrical wall, the lubricating film present there will be dissolved or washed off, and there is therefore the risk of a more rapid wear of the cylinder raceway.

ADVANTAGES OF THE INVENTION

In contrast to this, the advantage of the valve according to the invention is that the umbrella-like injection jet or spray cone can be designed with a relatively small cone angle, thus having the advantage of less wetting of the wall, and that, by means of a recess, the umbrella like injection jet extends, in the region of the recess, at an angle which is larger than the angle of remaining parts of the jet. Thus, a nose like bulge of the injection jet as an ignition jet towards the spark plug forms perpendicularly to the axis of the valve needle such that the spark plug is sufficiently supplied with fuel/air mixture, with the disadvantages mentioned in the introduction being avoided.

In an advantageous way, the injection jet sprayed by the fuel injection valve is formed in an umbrella-like manner by an annular guide face which adjoins the valve seat of the fuel injection valve and which is designed conically. At the same time, a corresponding guide face can also be provided on the valve head. Advantageously, at the same time, the recess has, on the annular guide face adjoining the valve seat, a generated surface which runs in the extension of the valve seat, so that the fuel flowing out between the valve head and valve seat or the corresponding fuel/air mixture in the case of a design as a blow-in valve arrives at the recess without being deflected, so that an effective shaping of the part deviating from the remaining injection jet is obtained in the region of the ignition jet. In a further embodiment, a further deflection of the ignition jet is formed by a bend at the transition edge between the valve seat and recess, with particular conditions of installation in the combustion space being taken into account.

BRIEF DESCRIPTION OF DRAWINGS

Three exemplary embodiments of the invention are represented in the drawing and are explained in more detail in the following description.

DESCRIPTIN OF THE EXEMPLARY EMBODIMENTS

Figure 1:
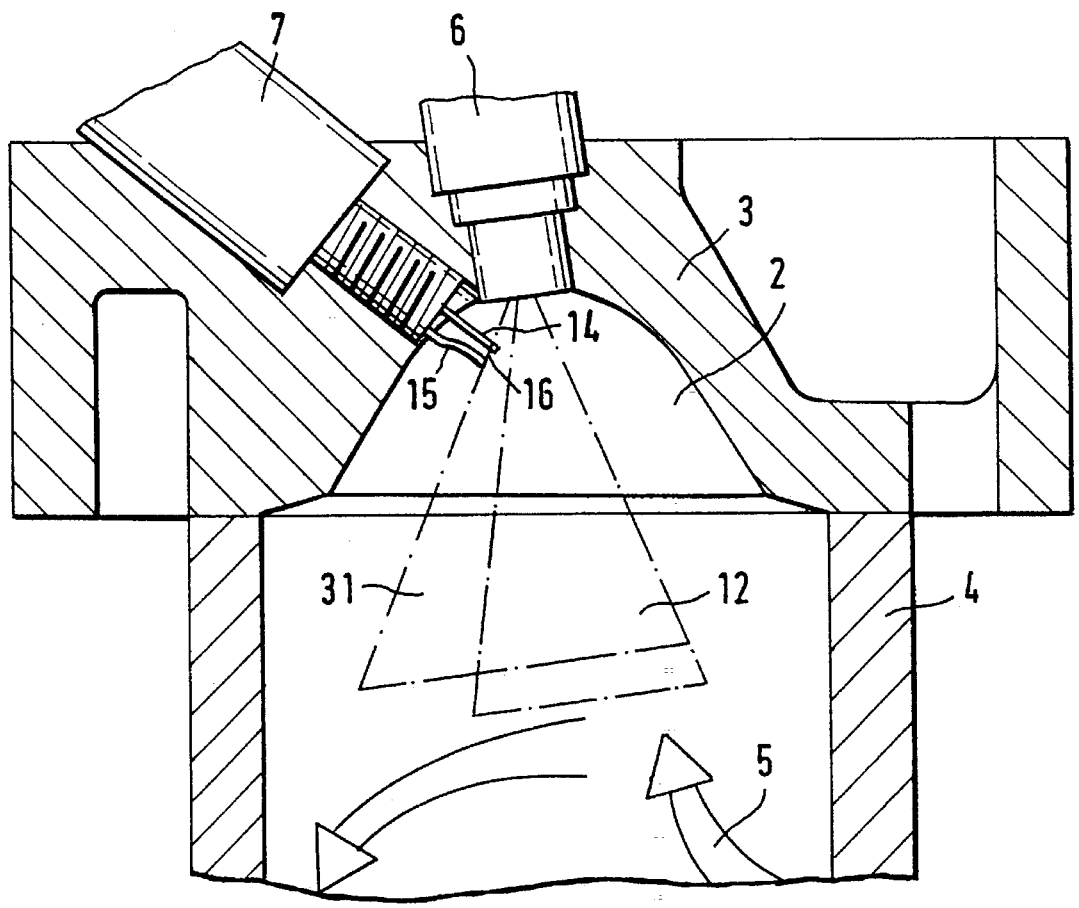
FIG. 1 shows a partial section through an internal combustion engine in a diagrammatic representation, with the arrangement of a spark plug and of an injection valve according to the invention.

FIG. 1 shows a combustion space 2 of an internal combustion engine, which combustion space 2 is delimited, on the one hand, by a cylinder head 3 and, on the other hand, by a cylinder liner 4, in which a piston, not shown further, of the internal combustion engine delimits the combustion space on the end face. In the present case, this is directed to an internal combustion engine which works by the two stroke combustion process, with the piston moved to the bottom dead center. The combustion space being scavenged by supplied air according to the arrows 5 shown and being filled with fresh air which, during the subsequent upstroke of the pump piston towards top dead center, is compressed, and, in the present case of a stratified combustion process, fuel is being introduced via a valve 6. The freshly introduced air can be a basic fuel/air mixture which is supplied to the combustion space and which, during the scavenging operation, displaces the previously burnt fuel/air mixture out of the combustion space to an outlet side, on the left in FIG. 1. These are known constructions which need not be described in more detail in the present case, since the essence of the design according to the invention relates mainly to the introduction of fuel or fuel/air mixture. It is known that on average a relatively lean fuel/air mixture with an air coefficient of $\Delta > 1$, which, when intermixed homogeneously, could no longer be ignited by a conventional spark plug, can nevertheless be burnt in the internal combustion engine when a relatively fuel rich mixture located in the region of the ignition spark of the spark plug is partially available for igniting this mixture. For this purpose, there is introduced into the cylinder head 3 a spark plug 7 which receives a fuel rich mixture in that fuel is introduced into the relatively lean basic mixture, which can also be only air, through the valve 6, in such a way that the fuel also comes into the vicinity of the spark plug. As already mentioned in the introduction, the fuel consumption and also the emission behavior of the internal combustion engine can be improved thereby.

The valve 6, via which the fuel or the fuel/air mixture is introduced at the latest at the ignition time, and the spark plug 7 are arranged at a location of the combustion space which is freed of islands of residual gas during the scavenging operation, so that sufficient oxygen is available for providing an ignitible mixture and for the further burnout of the residual mixture in the combustion space. This applies particularly to internal combustion engines adopting the two-stroke process. In four-stroke internal combustion engines, these conditions are less critical.

The valve for the introduction of fuel or a fuel/air mixture is designed as a valve with an outward-opening valve needle 9 having a valve head 10. Such a valve generates an umbrella-like injection jet 12 which describes essentially a cone envelope having a specific acute angle which, in the present case, is 30°. The angle of this jet is designed in such a way that it has as little contact as possible with the walls of the combustion space, particularly in walls of the cylinder liner 2, so that, as already described in the introduction, no fuel is precipitated directly on the combustion chamber walls. The spark plug has a middle electrode 14 and a ground electrode 15 which are assigned to one another in such a way that an ignition spark 16 located essentially in the generated surface of the injection jet 12 or near this flashes over between their ends. At the same time, the dynamic air movement of the combustion space filling must continue to be taken into consideration. Assignment is a matter of optimization.

Figure 2:
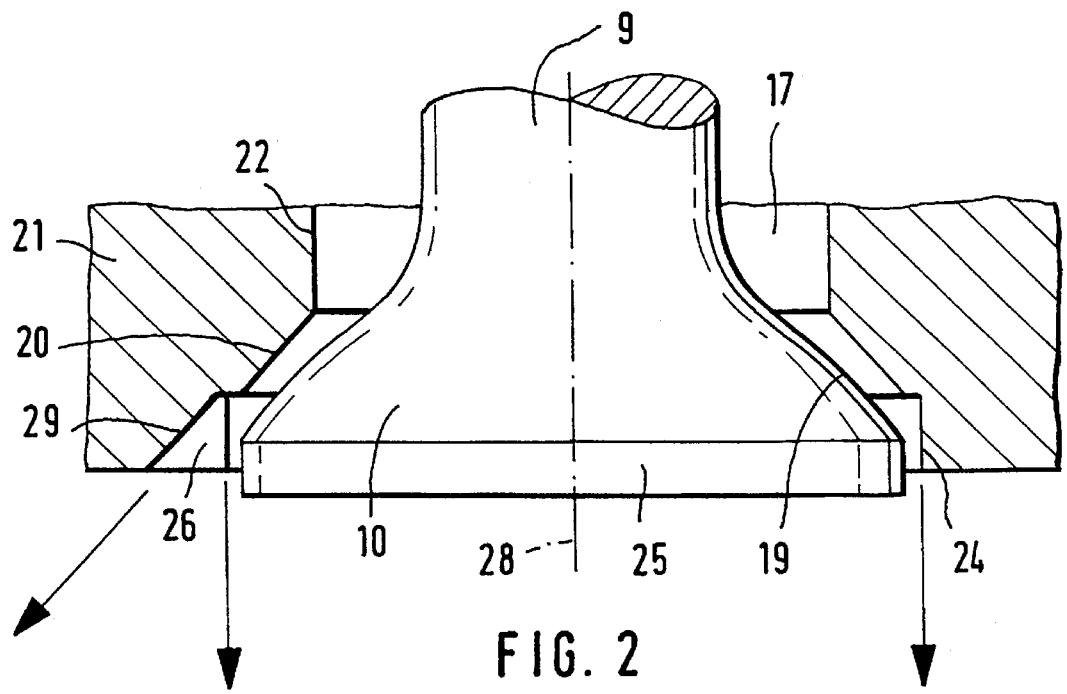
FIG. 2 shows a partial section through the valve in the region of the outlet of the fuel or of the fuel/air mixture in a first embodiment.

FIG. 2 shows a section through the end of the valve 6, with the valve head 10 and the valve needle 9. The valve needle can in this case be the valve needle of a fuel injection valve and be brought into the closing position by a return spring and moved in the opening direction by the supplied fuel, or the valve needle is triggered actively, for example by an electromagnet which, in cooperation with a return means, brings the valve needle into an opened or closed position. The fuel or the fuel/air mixture is conveyed to the valve head 10 in an annular space 17 surrounding the valve needle 9. In this process, a mixture formation can take place directly in the valve, in that fuel and air are supplied in the region upstream of the valve head, the supplied fuel advantageously being metered by a further valve.

The valve head has a conical generated surface 19 which faces the inside of the valve and which is machined as a sealing face and cooperates with a conical valve seat 20 of the housing 21 of the injection valve. The generated surface 22 of the annular space 17 merges in this case directly into the valve seat 20. This is followed by an annular guide face 24 which either is made cylindrical or has an acute angle which opens toward the combustion space and which is substantially smaller than the acute angle of the conical valve seat 20. As seen radially, the guide face 24 is assigned a cylindrical or likewise slightly conical portion 25 on the valve head. This portion adjoins the generated surface 19 and, together with the guide face 24, forms an annular gap. By means of this assignment, the abovementioned umbrella like injection jet 12 is formed, with an angle determined by the geometry of the guide face 24 and of the cylindrical part 25.

In a development according to the invention, the guide face 24 is interrupted by a recess 26. This has a generated surface 29 which faces away from the axis 28 of the valve needle and which is approximately in the extension of the valve seat 20, with approximately the same angle to the longitudinal axis 28 of the valve needle. In the region of this recess, the fuel or fuel/air mixture delivered by the valve is deflected to a lesser extent than in the region of the remaining guide face 24, so as to form a secondary jet or ignition jet 31 which is shown in FIG. 1 and which represents an interruption in the conical shape of the injection jet 12 in this region. This ignition jet is oriented towards the spark plug in such a way that only this small part of the discharged fuel or fuel/air mixture comes into the vicinity of the electrodes 14 and 15 of the spark plug, in order to be ignited there. This ensures that precisely the fraction of fuel necessary for ignition comes into the region of the spark plug, without the remaining fuel introduced coming disadvantageously into regions which would be of disadvantage for the treatment and the further combustion of the fuel. In particular, this avoids large parts of the introduced fuel or fuel/air mixture striking the wall of the combustion space too near or directly, with the disadvantages described in the introduction.

Here, the shape of the recess is decisive for the formation of this ignition jet 31, it being possible for the cross section of the recess to be designed according to the requirements. It can be a groove with side limitations parallel to one another, as seen in the circumferential direction of the axis 28, or else it can be a shaped groove which can be made with a corresponding shaping cutter. The run of the generated surface 29 is to be adapted to the necessary deflection of this part of the umbrella like injection jet 12. Furthermore, the size of the recess determines the quantity of fuel brought into the vicinity of the spark plug.

Figure 3:
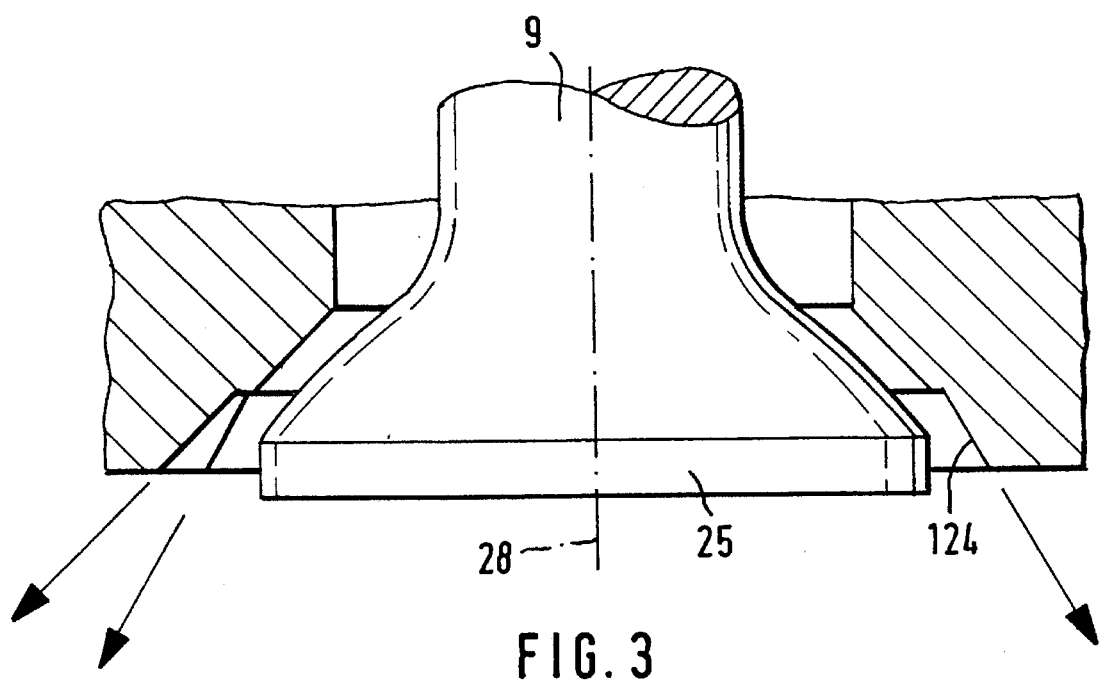
FIG. 3 shows a partial section through a valve in the region of the outlet of fuel or fuel/air mixture in a second embodiment.

FIG. 3 shows a version of the valve 6 with a cylindrical portion 25 on the valve head and with a guide face 124 which is designed so as to widen conically towards the combustion space.

Figure 4:
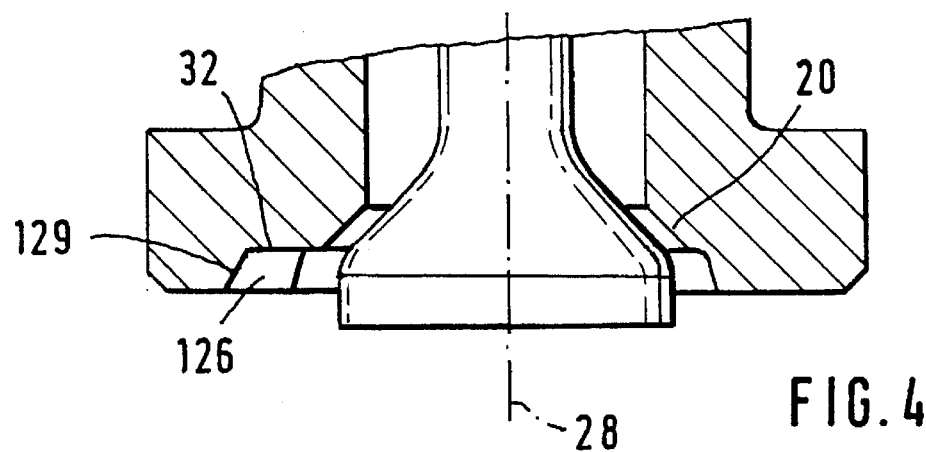
FIG. 4 shows a partial section through the valve in the region of the outlet of fuel or fuel/air mixture in a third embodiment.
Figure 5:
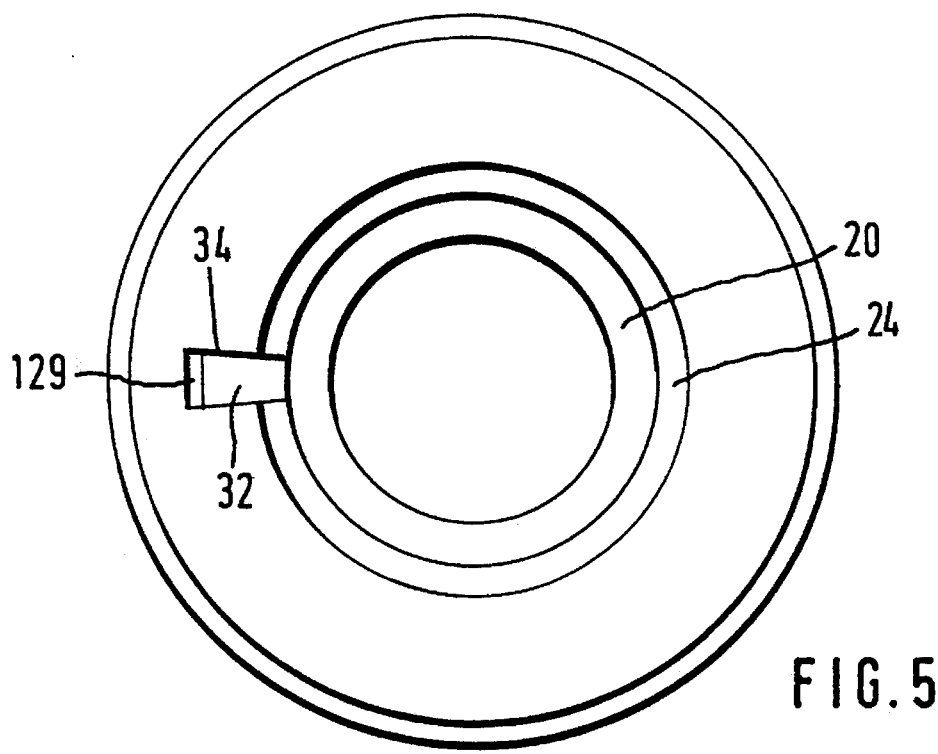
FIG. 5 shows a top view of this valve on its outlet side, with the valve needle being omitted.

FIG. 4 also shows another development of the valve, with a recess 126 now designed as a groove, with a bottom face 32 which lies in the radial plane relative to the axis 28 of the valve and which, with the end of the valve seat 20, forms an edge, and with a generated surface 129 which is now made somewhat steeper than the cone angle of the valve seat 20. In the top view of FIG. 5, it can be seen that the recess is a groove, the lateral limiting walls 34 of which are not parallel to one another, but form a radially outward-opening angle to one another. This takes into account a jet spread which is such that the thin jet can fan open on the outside, in order to achieve a better intermixing of fuel with air in the region of the electrodes of the spark plug.

The foregoing relates to preferred exemplary embodiments of the invention, it being understood that other variants and embodiments thereof are possible within the spirit and scope of the invention, the latter being defined by the appended claims.

I claim:

1. A valve for the introduction of fuel or fuel/air mixture into a combustion space (2) of an internal combustion engine, in which the fuel or the fuel/air mixture is injected directly through the valve (6) into the combustion space (2) of the internal combustion engine and is ignited there by a spark plug (7), in order to initiate the combustion, and the valve (6) has an outward-opening valve needle (9), between the valve head (10) and a conical valve seat (20) there is formed an umbrella like injection jet (12) of fuel or fuel/air mixture, the generated surface of which points towards the spark plug (7), and the introduced fuel quantity is metered in such a way that the internal combustion engine is operated with a lean fuel/air mixture, which the air coefficient ▲ is on average >1, wherein adjoining the valve seat (20) in an outlet direction of the injection jet, there is provided an annular guide face (24, 124) which has, in a region oriented towards the spark plug (7), a recess (26) deviating from the annular shape.

2. The valve as claimed in claim 1, wherein, at the valve head (10) in the outlet direction of the injection jet (12), there is provided, adjoining the sealing region (19) of the injection jet, cooperating with the valve seat (20), a continuously annular guide face (25).

3. The valve as claimed in claim 1, wherein the guide face (24, 124) of the valve seat (20) and of the valve head (10) are made cylindrical.

4. The valve as claimed in claim 1, wherein the guide face (24, 124), which adjoins the valve seat (20), is made conical, with a cone angle which is smaller than the cone angle of the valve seat (20), and the guide face (25) on the valve head (10) is made cylindrical.

5. The valve as claimed in claim 3, wherein the recess (26) has, on a side facing away from the valve head (10), a generated surface (29) which runs in an extension of the generated surface of the valve seat (20).

6. The valve as claimed in claim 4, wherein the recess (26) has, on a side facing away from the valve head (10), a generated surface (29) which runs in an extension of the generated surface of the valve seat (20).

7. The valve as claimed in claim 3, wherein the recess is designed in the form or a groove (126).

8. The valve as claimed in claim 4, wherein the recess is designed in the form of a groove (126).

9. The valve as claimed in claim 7, wherein the recess is designed in the form of a groove (126), with a first radially extending limiting face (32) lying in a radial plane relative to the axis of the valve head and with a conically outward-extending second limiting face (12) adjoining the said limiting face (32).

10. The valve as claimed in claim 8, wherein the recess is designed in the form of a groove (126), with a first radially extending limiting face (32) lying in a radial plane relative to the axis of the valve head and with a conically outward-extending second limiting face (12) adjoining the said limiting face (32).

11. The valve as claimed in claim 9, wherein the groove (126) has lateral limiting walls (34) which are at a radially outward-opening angle to one another.

12. The valve as claimed in claim 10, wherein the groove (126) has lateral limiting walls (34) which are at a radially outward-opening angle to one another.

* * * * *